Figure 4:
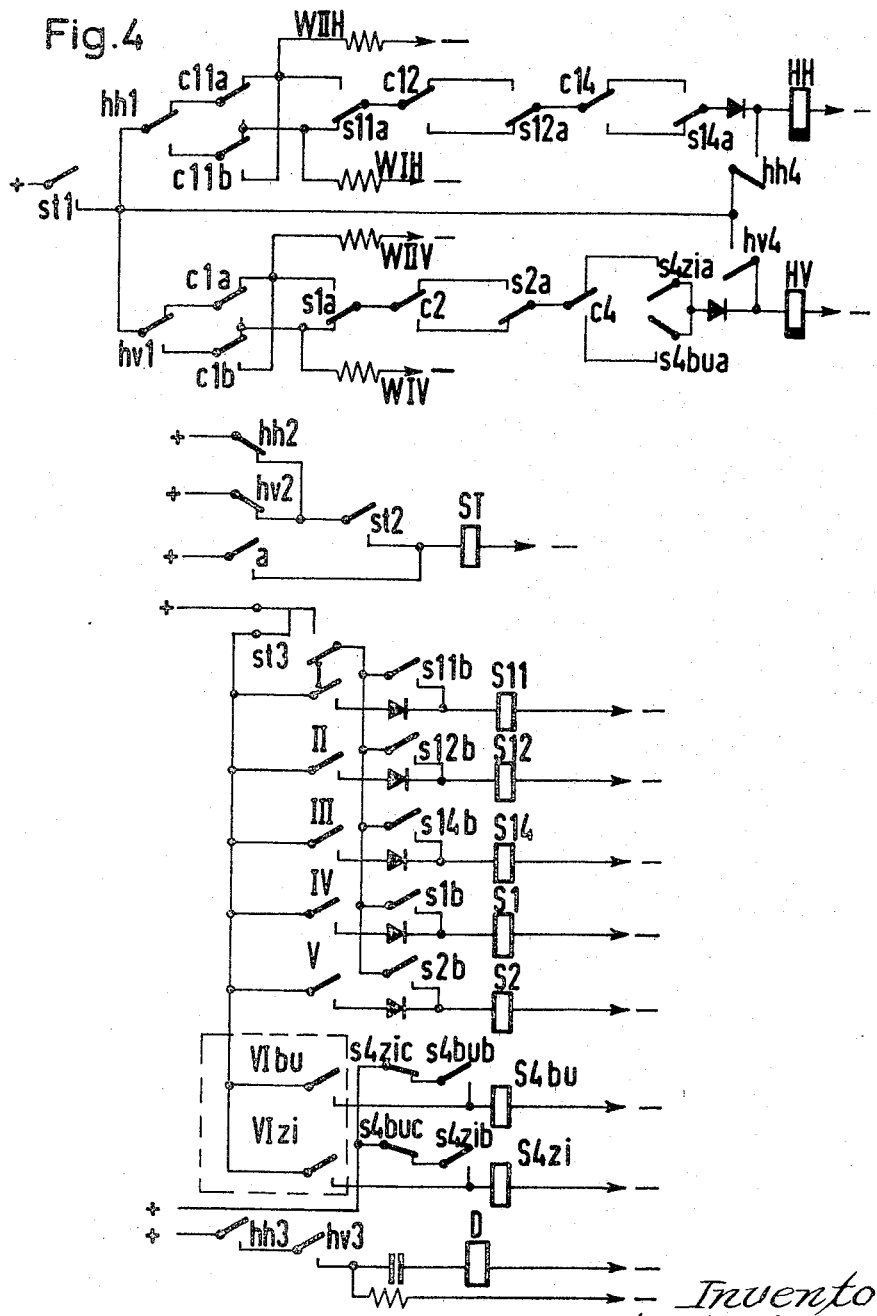

March 14, 1967  R. STABENAU ETAL  3,308,917
TYPE CARRIER POSITIONING MEANS EMPLOYING TWO MOTORS
Filed Feb. 19, 1965  4 Sheets-Sheet 1
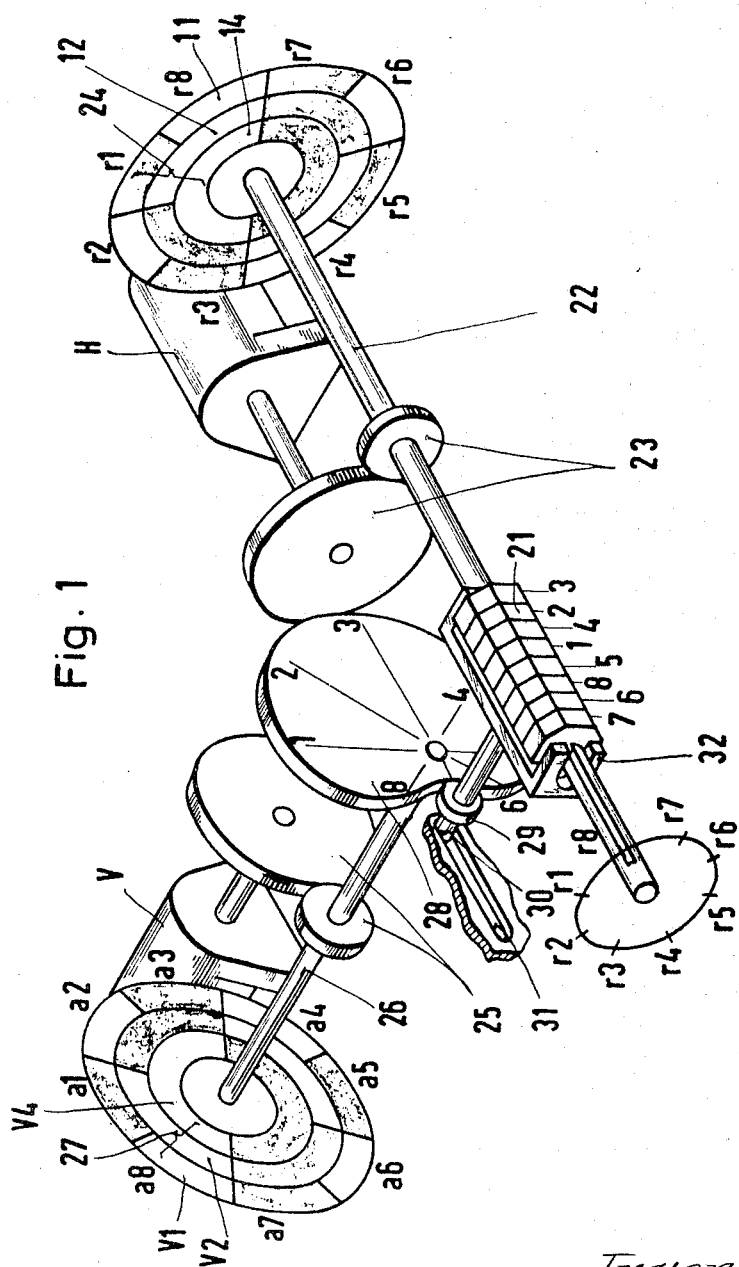
Inventors.
Robert Stabenau,
Sven Voelcker, &
Hermanus Lambertus Tutert
By Lee & Lee Attys March 14, 1967  R. STABENAU ETAL  3,308,917
TYPE CARRIER POSITIONING MEANS EMPLOYING TWO MOTORS
Filed Feb. 19, 1965  4 Sheets-Sheet 2
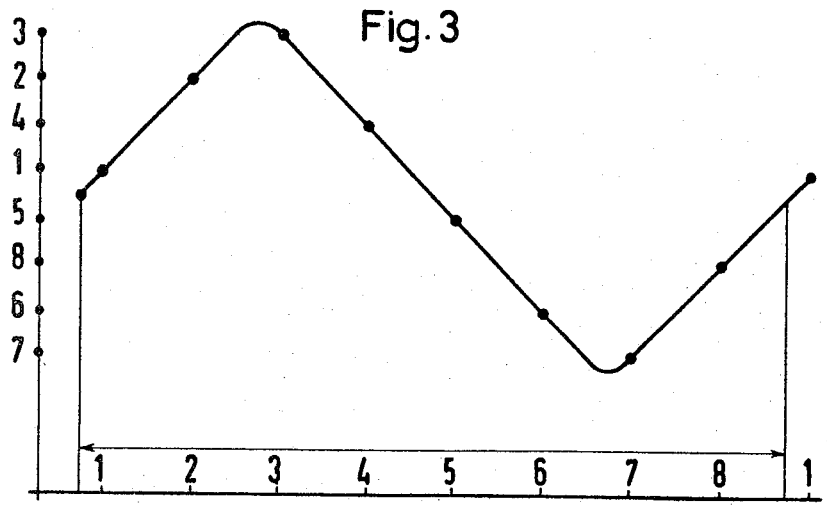
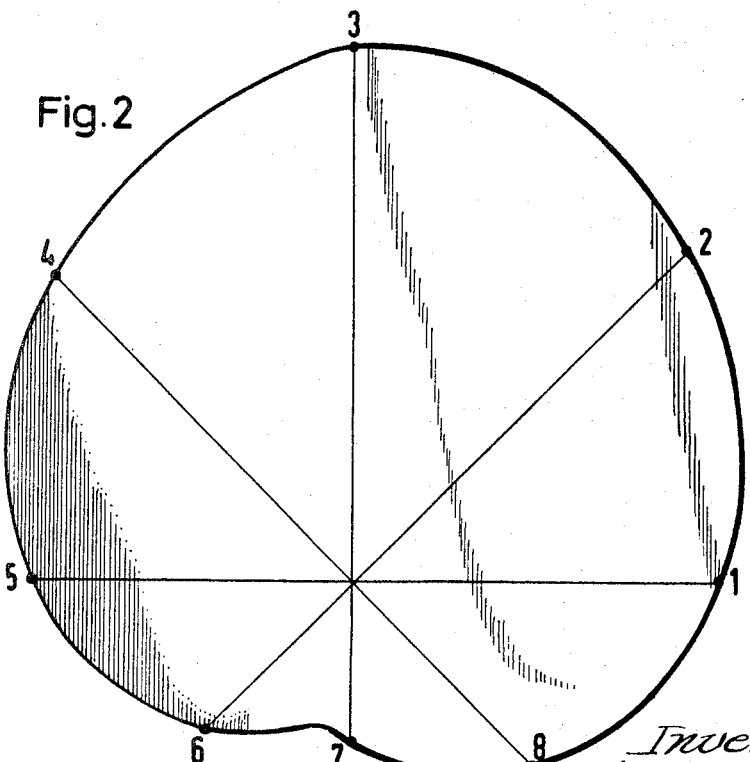
Inventors,
Robert Stabenau,
Sven Voelcker, &
Hermanus Lambertus Tutert.
By Stice & Stice Attys.

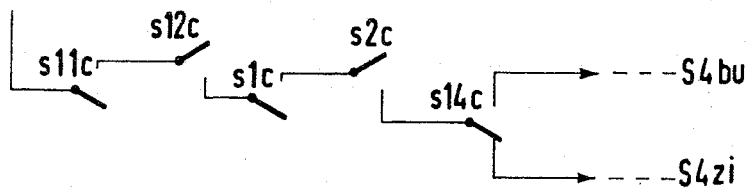
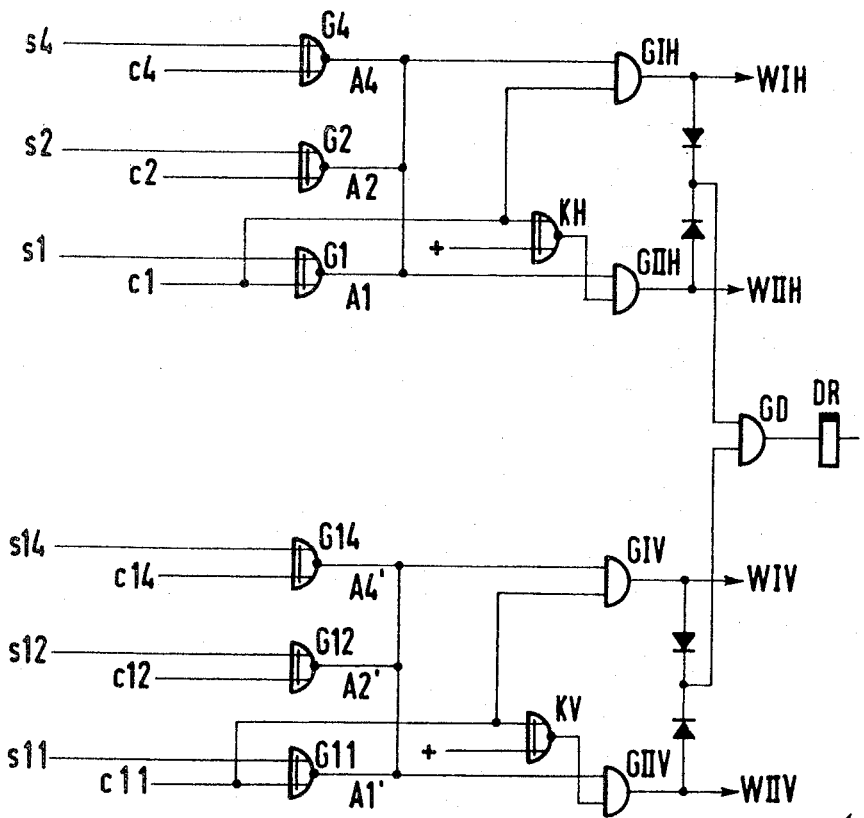

United States Patent Office 3,308,917
Patented Mar. 14, 1967

3,308,917
TYPE CARRIER POSITIONING MEANS EMPLOYING TWO MOTORS
Robert Stabenau, Sven Voelcker, and Hermanus Lambertus Tutert, Munich, Germany, assignors to Siemens & Halske Aktiengesellschaft Berlin and Munich, a corporation of Germany
Filed Feb. 19, 1965, Ser. No. 433,850
Claims priority, application Germany, Feb. 20, 1964, S 89,611
4 Claims. (Cl. 197—48)

The invention relates to devices for positioning type rollers or similar type carriers in two coordinate directions in accordance with code impulses such as are commonly employed in output devices of electronic computers or teletype machines. It is an object of the invention to effect such adjustment or setting with the least mechanical expenditure. By reduction of the masses to be moved in the operation to as small an amount as possible, high operating speeds should be attainable and noise reduced to a minimum.

This is achieved according to the invention that at least for the shifting in the one direction, as for example, turning of the type carrier, an electric motor controllable by code impulses is provided which has in the stator several windings with one or several poles each, and a mono or multiple rotor, advanceable in steps, and alternately with only one stator winding and a poled rotor or poled stator. The particular angular position of the rotor on excitation of one of the windings, or a certain poling of such a single winding is obtained through the fact that the rotor with its closest lying pole pair is drawn into the closest lying transverse axis of this winding, or, in the use of a poled rotor, the latter is directed into such axis. This motor construction is designated in the following description as a "step motor." In such arrangement any expensive design or productive considerations as well as selecting gearing are dispensed with.

In an apparatus of the type mentioned, operating in dependence on code impulses according to a multi-step alphabet, according to a preferred further development of the invention a predetermined number of the steps of each symbol in such code is conducted to one step motor and the remaining steps are conducted to the other step motor.

In such an arrangement with five-step alphabet symbols and letter digit alternation, the letter and digit alternating signs are preferably storable in a stable manner by means of a sixth step up to the next type group change, just as this setting can be executed from symbol to symbol with use of a six-step alphabet.

A circuit arrangement for a device for five-step alphabet symbols with leter-digit alternation is so constructed, according to one embodiment of the invention, that the letter or digit type group is controllable with the aid of a relay which is excitable through a series circuit of contacts of the control relays of the similar steps for letter and digit alteration and an alternating contact of the control relay of the step that is different for letter and digit alternation.

According to another further development of the invention, for the conversion of a rotary movement of the setting shaft into a longitudinal displacement perpendicular to such shaft, there is employed an eccentric, for example a heart-shaped eccentric, utilizing a spiral development.

In a preferred form of the invention for each setting shaft there is provided a code comparison disk, with the aid of which, in the event of position difference, a subsequent turning of this shaft is effected by the appertaining step motor. This additional device yields, especially for receiving converters which operate according to a multistep code, simple but positively and rapidly operating systems.

In an apparatus with permanent magnet system in the step motor this arrangement can serve for the automatic retention in the printing position.

Further details of the invention appear from the example of construction described in the following and illustrated in the drawing, in which:

FIG. 1 is a perspective view of an adjusting drive transmission for a type roller printer;
FIG. 2 is a front view of the cam plate for the longitudinal displacement of the type roller utilized in the arrangement of FIG. 1;
FIG. 3 illustrates a development of the plate according to FIG. 2;
FIG. 4 is a wiring diagram of the control device for the step motor;
FIG. 5 illustrates a modification of a part of the wiring diagram represented in FIG. 4; and
FIG. 6 is a wiring diagram of another control device for the step motors.

The device according to FIG. 1 is intended for a teletype machine which can be installed, for example, as receiving machine, in a teletype installation according to the six-step code. The adjusting or setting device is constructed as follows: A type roller 21 is mounted on a shaft 22, for longitudinally sliding movement thereon but fixed as to relative rotation therebetween. The type roller carries eight octagonal type wheels arranged in a row, axially one behind the other and therefore contain a total of 64 type faces. Tangential displacement of the type roller is effected by a step motor H over reduction gearing 23 operating with a reduction ratio of 20:8. On the shaft 22 there is further provided a code comparison disk 24 having concentric contact rings 11, 12, 14, on which there are provided 8 radial comparison fields $r1$ to $r8$. In a similar manner for the axial displacement of the type roller 21, a step motor V drives a shaft 26 over reduction gearing 25, on which shaft there is mounted a code comparison disk 27 having concentric contact rings V1, V2, V4, provided with fields $a1$ to $a8$. The longitudinal displacement of the type roller 21 on the shaft 22 is accomplished with the aid of a cam plate 28, a roller 29 being maintained in engagement therewith by spring means. The shaft 30 carrying the roller 29 is disposed in a slot 31 fixed in the apparatus, and rigidly carries a lever-type member 32 partially enclosing the type roller, with the member 32 being rigidly connected with the shaft 30. The shaft 26 carries a spiral cam, as illustrated in FIGS. 2 and 3, the individual type roller strokes or travel in which appear as radii. To enable resetting with a single revolution and to avoid jumps in the displacement, the positions on the type roller which correspond to the binary values of the code comparison disk are so distributed on the type roller that between the rising and the descending part of the spiral cam there exists a phase displacement of a half symbol stroke. This is achieved through the fact that the type roller, in the course of the rotation of the setting shaft, makes a uniform back and forth movement and that no differences exist with respect to the control of the two gear groups determinative for rotational and longitudinal displacement, respectively, of the type carrier.

The step motors used in the above example make twenty steps per revolution. They have two windings each and five pairs of poles. A new setting step is occasioned in these motors in each case by the alternation between the two windings. Change in rotational direction is achieved, in case it is desired, by an alternation between two winding groups allocated each to a rotational direction. The setting code is scannable on the code comparison disks in any manner, as for example, optcially, inductively or capacitatively, from the respective tracks. It is also possible to use switching cams in place thereof.

With the aid of the wiring diagram of FIG. 4 there is explained a control of the step motors for relatively low speeds, in which relays and contacts are utilized as switching elements. The start signal for a new symbol is in each case given over a contact $a$ to a relay $St$, which holds itself over contacts $hh2$ or $hv2$ and a contact $st2$. The controlling symbol combination of the five-element code is set with the aid of contacts I, II, III, IV, V and VI$bu$ or VI$zi$, simultaneously with the contact $a$ and stored in the relays S11, S12, S14, S1, S2, S4$bu$, S4$zi$, over the rest side of the sequence contact $st3$. With the exception of the relays S4$bu$ and S4$zi$ the relays are held over one of their own contacts and the working contact $st3$. The two relays S4$zi$ and S4$bu$ are held in each case over two opposite running contacts of the two relays. They serve for the storing of the particular letter or digit alternation state. The above mentioned rest contact $st3$, during its opening, prevents a new storage of the setting and printing operation.

The step motors are of such a nature and their two windings are so connected that in the position for the symbol printing, considering the displacement of only one of the two coordinates, alternately one of the two windings WIH, WIIH or WIV, VIIV, respectively, of the associated step motor is placed on voltage over the corresponding contacts when the position of the rotor is in accordance with the other winding. Thereby the rotor of the particular motor remains in motion as long as the upper one of the two associated contacts, $c1a$, $c1b$ and $c11a$, $c11b$ receives voltage. Over the contacts $hv1$ and $hh1$ there is built up, in their rest position as shown, one test chain each, consisting of the contacts $c1a$, $s1a$, $c2$, $s2a$, $c4$, $s4zia/s4bua$ and also $c11a$, $s11a$, $s12$, $s12a$, $c14$, $s14a$ Thereupon there follow the relays HV or HH. If during the revolution of the setting shafts among all the allocated contacts $c$ and the corresponding contacts $s$ agreement is ascertained, then, as will be apparent, the relay HV or HH is energized. Thereby the connection of lines associated with the plus pole of the current source between the contacts $c1a$ and $c1b$ or $c11a$ and $c11b$ is so changed that now the actuated winding agrees with the momentary rotor position. The rotor, therefore, is locked in this controlled position. Since the running times necessary of the two setting gears for the achievement of the desired printing position are as a rule different, the relays HH and HV are held over their own contacts $hh4$ and $hv4$ until the two relays HH and HV have energized.

When this has taken place in the setting circuits for both step motors, then over the two contacts $hh3$ and $hv3$, the print magnet D is energized and thereby the desired symbol is printed. Simultaneously, over the two parallel connected contacts $hh2$ and $hv2$, the adjusting relay $St$ is de-energized, whereby a new printing operation can be initiated.

Within the scope of the invention the contact VI$bu$ controllable by the letter alternating signal and the contact VI$zi$ controllable by the digit alternating signal may also be replaced by a series circuit comprising contacts of the relays S1, S2, S11, S12, S14. For example, the lower portion of FIG. 4 frame by broken lines may be replaced by the circuit illustrated in FIG. 5 comprising the working contacts $s1c$, $s2c$, $s11c$, $s12c$ and the alternating contact $s14c$.

At higher speeds there are expediently used for the comparable circuit, electronic structural elements operating without insertia, as for example, a circuit according to FIG. 6. The required settings are entered on the lines $s1$, $s2$, $s4$, $s11$, $s12$ and $s14$, while the lines $c1$, $c2$, $c4$, $c11$, $c12$ and $c14$ contain the momentary position information of the two code comparison disks 27 and 24, the scanning of which is expediently carried out optically, inductively or capacitatively.

Each pair of lines $s$ . . . and $c$ . . . are compared in an exclusive "or" gate (G1, G2, G4, G11, G12 and G14). Only if both agree is the output (A1, A2, A4, A11, A12, A14) of the particular gate involved without current. The three outputs belonging to a coordinate drive are conducted in common to the two motor control gates GIH and GIIH or GIV and VIIV. Simultaneously there is applied from the line $c1$ still another connection to the second input of the gate GIH or over an additional exclusive "or" gate KH applied inverted to the second input of gate GIIH. At the output of gates GIH and GIIH there are connected the two motor windings WIH and WIIH. Likewise there branches off from the line $c11$ a connection to the second input of the gate GIV or, inverted over the gate KV, to the second input of the gate GIIV.

If now a symbol is set on the lines $s$, then the allocated lines A conduct voltage until all the lines $s$ . . . are in the same state as the corresponding lines $c$. The line $c1$ conducts voltage at each second step of the motor, which voltage is conducted to the two control gates, the other inputs of which receive voltage from the lines A. When the line $c1$ conducts voltage, then the winding WIH of motor H is switched on over the gate GIH, whereby the rotor is drawn into the next position. As a result, through the code disk, the voltage of $c1$ is switched off, and thereby WIIH is without current. Simultaneously the winding WIIH is energized over the gates KH and GIIH, which now draws the rotor into the next position. Exactly corresponding conditions are present with respect to the motor V for the line $c11$, the gate GIV, the windings WIV and WIIV as well as the gates KV and GIIV.

With the achievement of the required position (when all the lines $s$ . . . correspond in their state to the corresponding lines $c$ . . . ) the lines A . . . are without current— that is, the two output gates reverse the effect of line $c1$. The immediately following winding is then not excited, but instead the same winding which brought the rotor into the required position remains energized and thus holds the rotor securely in position. The relay DR is energized over the gate GD and thereby the printer magnet. A voltage monitoring in the total of four motor windings there causes, over a timing member, the stroke of the printer hammer. The timing member is necessary in order to prevent the printing stroke from taking place during the operation by reason of the individual control impulses.

Within the scope of the invention it is also possible to use other electric step motors of the type initially referred to, as for example, those known as selector motors for telephone exchange installation.

In the case of a parallel arrangement of the adjusting shafts, there can also be used an axial cam in place of the heart-shaped eccentric.

Changes may be made within the scope and spirit of the appended claims which define what is believed to be new and desired to have protected by Letters Patent.

We claim:

1. An apparatus for setting of a type carrier and the like comprising means for mounting the type carrier for movement in two different coordinate directions in response to a multi-unit code signal wherein a portion of said signal controls displacement of the type carrier in one coordinate direction and the remaining portion of said signal controls displacement of the type carrier in the other coordinate direction, a pair of motors, means operatively connecting one of said motors to the type carrier for effecting movement of the carrier in one direction, means operatively connecting the other of said motors to the type carrier for effecting movement of the carrier in the other direction, means including a source of code pulses forming said multi-unit code signal for selecting a desired position of the type carrier in one of the coordinate directions corresponding to a portion of the code pulses and in the other coordinate direction corresponding to the remaining code pulses of said multi-unit code signal, means responsive to said selecting means for energizing each of said motors in accordance with the selected position, and means for maintaining said energizing means operable until the selected position in each coordinate direction is achieved.

2. The apparatus as defined in claim 1 including a printing hammer cooperable with the type carrier, and means for actuating said printing hammer when the desired position is achieved.

3. An apparatus for setting of a type carrier and the like comprising means for mounting the type carrier for movement in two different coordinate directions in response to a multi-unit code signal wherein a portion of said signal controls displacement of the type carrier in one coordinate direction and the remaining portion of said signal controls displacement of the type carrier in the other coordinate direction, a pair of motors, means operatively connecting one of said motors to the type carrier for effecting movement of the carrier in one direction, means operatively connecting the other of said motors to the type carrier for effecting movement of the carrier in the other direction, a pair of position encoders each coupled to a respective one of said motors and having outputs in accordance with a previously selected set position of the type carrier in each of the coordinate directions, means including a source of code pulses forming said multi-unit code signal for selecting a desired position of the type carrier in one of the coordinate directions corresponding to a portion of the code pulses and in the other coordinate direction corresponding to the remaining code pulses of said multi-unit code signal, means for comparing the set position with the desired position in each coordinate direction and actuating each of said motors accordingly, and means for maintaining said comparing and actuating means operable until the selected desired position in each coordinate direction is achieved.

4. The apparatus as defined in claim 3 including a printing hammer cooperable with the type carrier, and means for actuating said printing hammer when the desired position is the same as the set position in each coordinate direction.

References Cited by the Examiner
UNITED STATES PATENTS

| | | | |
|---|---|---|---|
| 862,402 | 8/1907 | Krum | 178—40 X |
| 1,936,656 | 11/1933 | Bell | 178—34 |
| 2,637,619 | 5/1953 | Stein | 178—34 X |
| 2,757,775 | 8/1956 | Hickerson | 197—49 |
| 2,805,620 | 9/1957 | Rosen et al. | 101—93 |
| 2,927,676 | 3/1960 | Abbondanza | 197—6.6 |
| 2,945,091 | 7/1960 | Camepa | 197—55 X |
| 3,042,174 | 7/1962 | Howard | 197—55 |
| 3,063,540 | 11/1962 | Howard | 197—49 |
| 3,131,627 | 5/1964 | Onderson et al. | 197—51 X |
| 3,201,514 | 8/1965 | Kleinschmidt | 197—48 X |
| 3,227,258 | 1/1966 | Pamier et al. | 197—6.6 |

FOREIGN PATENTS 115,086 10/1945 Sweden.

ROBERT E. PULFREY, *Primary Examiner.*

E. S. BURR, *Assistant Examiner.*